UNITED STATES PATENT OFFICE.

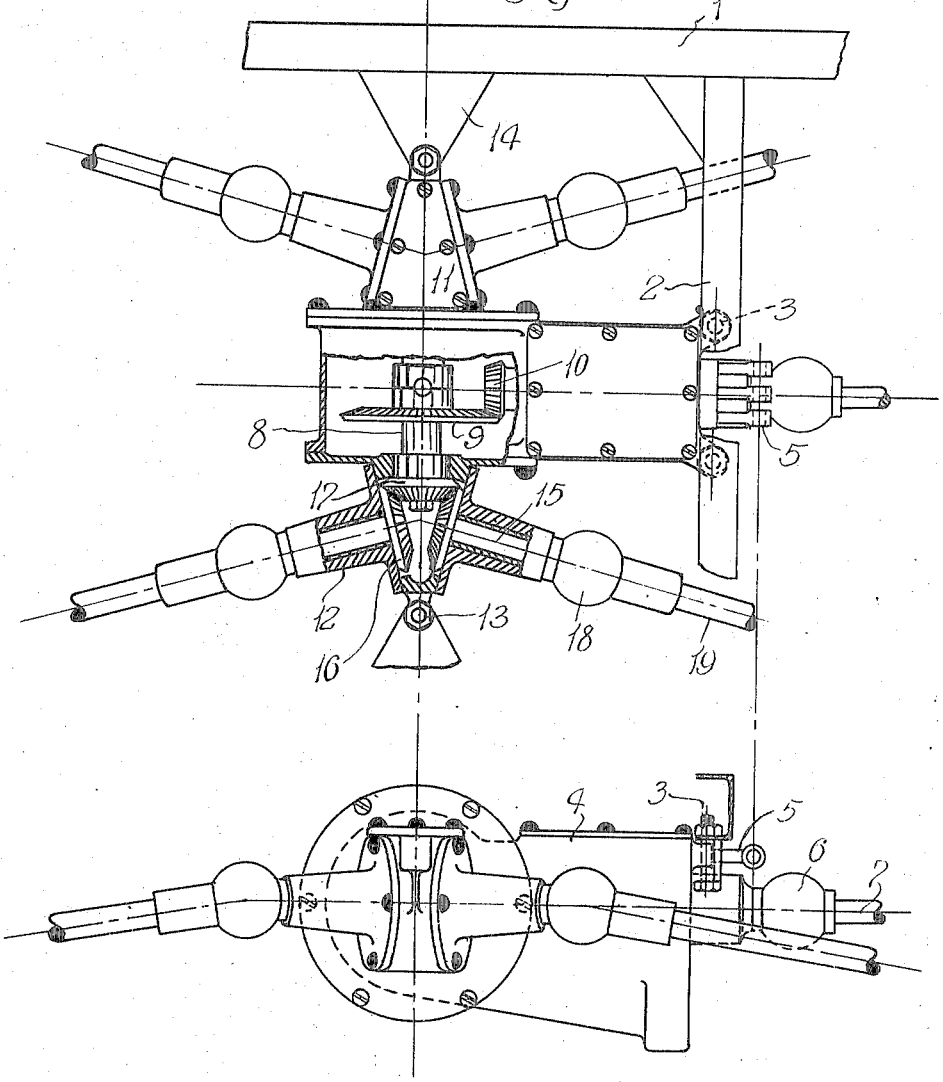

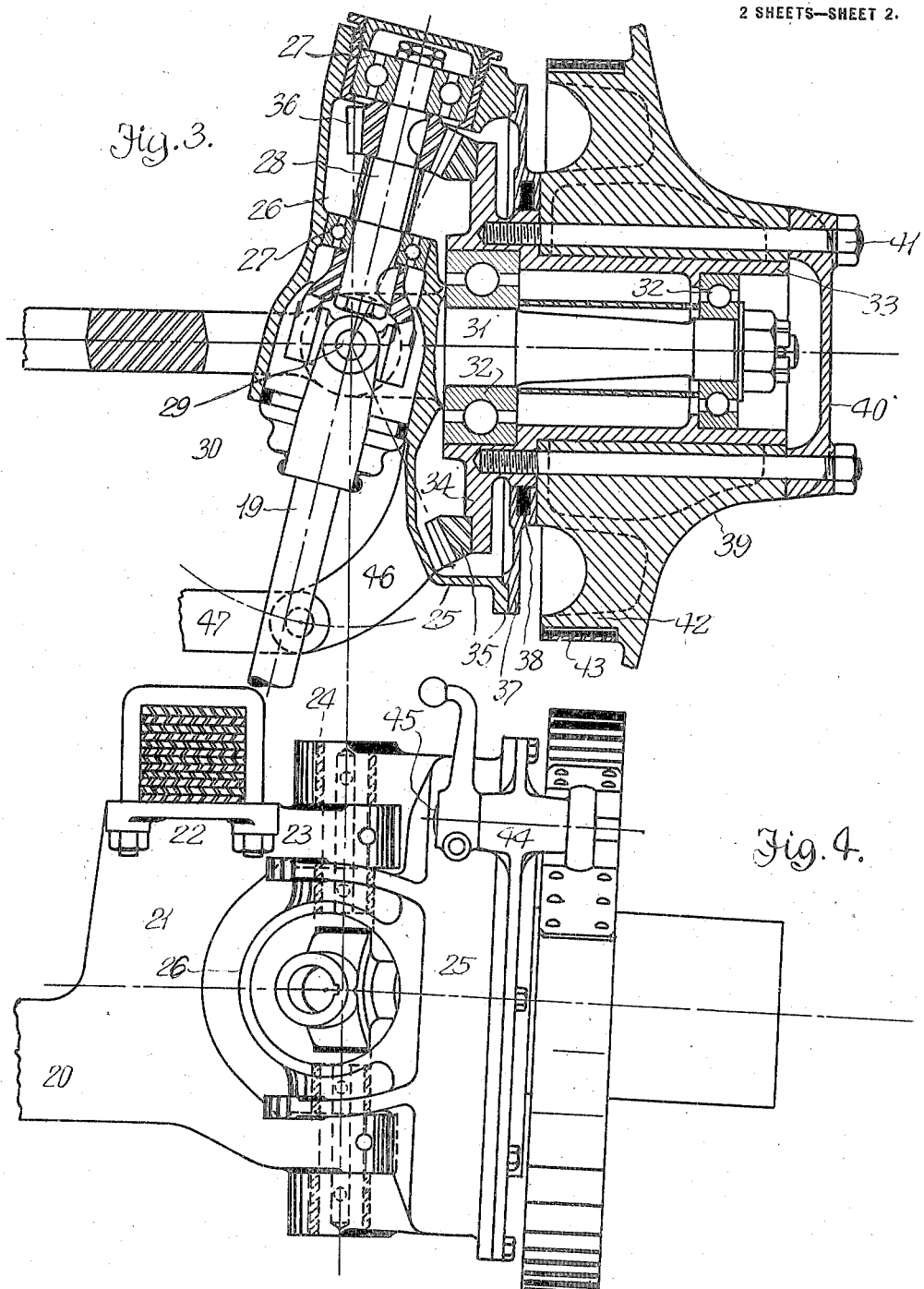

WILLIAM S. LEE, OF DETROIT, MICHIGAN.

FOUR-WHEEL DRIVE FOR VEHICLES.

1,283,819.     Specification of Letters Patent.     Patented Nov. 5, 1918.

Application filed July 21, 1917. Serial No. 181,945.

*To all whom it may concern:*

Be it known that I, WILLIAM S. LEE, a citizen of the United States of America, residing at Detroit, in the county of Wayne and State of Michigan, have invented certain new and useful Improvements in Four-Wheel Drives for Vehicles, of which the following is a specification, reference being had therein to the accompanying drawings.

This invention relates to a four wheel drive for vehicles, and has special reference to automobiles that may be provided with wheels to be individually driven from a single power plant, individually controlled by a brake mechanism, and steered in synchronism.

The primary object of my invention is to provide positive and reliable means, in a manner as hereinafter set forth, for driving each wheel of an automobile from a power plant and a differential mechanism, said means including a driving mechanism embodied in wheel knuckles, which permits of the wheels being driven irrespective of the angularity of said wheels relative to axles supported thereby. Such driving mechanism permits of the wheels being individually steered and in consequence of this arrangement, an automobile may be turned in a comparatively small space and more easily controlled.

Another object of my invention is to provide a four wheel drive for an automobile that permits of a brake mechanism being used in connection with each wheel, and by applying the brakes of all wheels, it is possible to safely control the operation of the automobile in places that will be extremely dangerous if brakes were only applied to the rear wheels, as is the usual practice.

A further object of my invention is to provide an operating mechanism for automobiles wherein the parts are constructed with a view of reducing the cost of manufacture and at the same time retain those features by which durability, simplicity of construction, efficiency and ease of assembling are secured. With such ends in view, my invention resides in the novel construction to be hereinafter considered and then claimed.

Reference will now be had to the drawings, wherein—

Figure 1 is a plan of a portion of an automobile, partly in section, showing a differential mechanism of the four wheel type;

Fig. 2 is a side elevation of the same;

Fig. 3 is an enlarged horizontal sectional view of a wheel and its driving, steering and brake mechanism, and Fig. 4 is a rear elevation of the same.

In describing my invention by aid of the views above referred to, I desire to point out that the same are intended as merely illustrative of an example whereby my invention may be put into practice and I do not care to limit myself to the precise construction and arrangement of parts shown. The following description is therefore to be broadly construed as including substitute constructions and arrangements of parts that are the obvious equivalents of those to be hereinafter referred to.

In the drawings, the reference numeral 1 denotes a portion of an automobile frame or chassis having a transverse member 2. Connected to the member 2 by bolts 3 or other fastening means is the front end of a transmission casing 4 containing the usual change speed gear transmission mechanism controlled by a plurality of shift rods 5 extending into the casing 4. The casing 4 has a front end universal joint 6 for a shaft 7 adapted to be driven by an engine or other power plant, and the rear end of the casing 4 accommodates a differential mechanism, including a shaft 8 and beveled gear wheels 9 and 10 operated from the transmission mechanism within the casing 4.

The sides of the casing 4 are provided with housings 11 having angularly disposed bearings 12, and said housings are connected, as at 13, to inwardly projecting brackets 14 carried by the frame 1. Journaled in the bearings 12 are stub shafts 15 having the inner ends thereof provided with beveled gear wheels 16 meshing with beveled gear wheels 17 on the ends of the differential shaft 8. The outer ends of the stub shafts 15 are provided with universal joints 18 connected to diverging drive shafts 19.

The reference numeral 20 denotes one of the axles of the automobile, and the front and rear axles are identical in construction as far as the ends thereof are concerned. That is, each end of each axle has a wheel that is driven from one of the diverging shafts 19, and each wheel provided with a brake mechanism and a steering mechanism so that the wheels may be individually or collectively controlled. As the ends of the axles are identical in construction, I deem it only necessary to describe one end of an axle, as shown in Figs. 3 and 4. The axle has a vertically disposed yoke 21 providing a spring perch 22, and mounted in the apertured ears 23 of the yoke 21 are the trunnion pins 24 of a knuckle, composed of a cylindrical casing 25 and a horizontal angularly disposed casing 26, said casings being integral.

In the horizontal angularly disposed casing 26 are bearings 27 for a shaft 28 and said shaft is connected by a universal or Cardan joint 29 to an end of the drive shaft 19 extending into the casing and provided with a dust guard 30.

The casing 26 has an integral wheel spindle 31 extending through the cylindrical casing 25 and provided with anti-frictional bearings 32 for an inner hub member 33. The inner hub member 33 extends into the casing 25 and has a peripheral flange 34 provided with a circular rack or beveled gear wheel 35 constantly in mesh with a pinion or beveled gear wheel 36 fixed on the shaft 28.

The casing 25 has a cover or closure member 37 provided with a dust ring or guard 38 engaging the inner hub member 33, to exclude dust and dirt from the casings 25 and 26.

On the inner hub member 33 is a demountable outer member 39 and the inner hub member 33 is closed by a cap 40, which together with the outer member 39 are held by screw bolts or tie rods 41 extending through said cap, the outer hub member 39 and into the inner end of the inner hub member 33. By removing the screw bolts or tie rods 41 the outer hub member 39 can be easily removed from the inner hub member, and easy access may be had to the end of the spindle 31 should it be desired to disassemble the parts of the knuckle. The outer hub member 39 has, in addition to the usual spokes, rim and tire, a brake drum 42 and surrounding said brake drum is a brake band 43 having one end thereof attached to a bearing 44 carried by the closure member or cover 37 of the casing 25. The opposite end of the brake band 43 is connected to a crank shaft 45 journaled in the bearing 44, and said crank shaft can be actuated in the usual and well known manner. All of the brake bands may be operated in synchronism, or the brake bands of one axle operated independent of the brake bands of the other axle.

The casing 25 has apertured arms 46 and pivotally connected to these arms is a steering gear rod 47. The wheels at the ends of the axles may be individually steered or the wheels of the front axle steered in synchronism and independent of the wheels of the rear axle which may also be steered in unison.

From the foregoing, it will be observed that I have devised a four wheel drive for an automobile including hollow knuckles into which diverging drive shafts extend for imparting movement to wheels carried by the knuckles, and it is possible to operate the diverging shafts practically from a point central of an automobile frame or chassis. With tractors or trucks having a drive in accordance with my invention, it is possible to use various kinds of power plants.

What I claim is:—

1. In an automobile, the combination of axles, hollow knuckles carried thereby, wheels supported by said knuckles, universal joints having a neutral position in said knuckles relative to said axle and said wheels, diverging drive shafts connected to said universal joints, and means connected to said universal joints and extending beyond the axial lines of said wheels for imparting movement thereto.

2. In an automobile, an axle, a hollow knuckle trunnioned in an end of said axle, and composed of communicating casings, an inner hub member extending into one of said casings, a demountable wheel on said inner hub member, a drive shaft extending into the other casing of said knuckle, and means in said casing transmitting power from said drive shaft to said inner hub member.

3. In an automobile, an axle, a hollow knuckle at an end thereof composed of communicating casings, an inner hub member extending into one of said casings, a demountable wheel on said inner hub member, a shaft journaled in the other casing of said knuckle, a drive shaft extending therein and connected to said shaft for imparting movement thereto, beveled gear wheels operated by said shaft for imparting movement to said inner hub member, and a bearing for said inner hub member.

4. In a vehicle, an axle, a wheel rotatable relative to said axle, and a drive shaft intersecting the axis of said wheel and adapted for imparting movement to said wheel, said drive shaft having a joint in the axis of said wheel.

In testimony whereof I affix my signature in the presence of two witnesses.

WILLIAM S. LEE.

Witnesses:
KARL H. BUTLER,
ANNA M. DORR.